(12) United States Patent
Bennett et al.

(10) Patent No.: US 7,953,841 B2
(45) Date of Patent: May 31, 2011

(54) MONITORING AN RTP DATA STREAM BASED ON A PHONE CALL

(75) Inventors: Timothy Mark Bennett, Colorado Springs, CO (US); William Grant Grovenburg, Monument, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 3173 days.

(21) Appl. No.: 10/225,179

(22) Filed: Aug. 22, 2002

(65) Prior Publication Data

US 2004/0037267 A1 Feb. 26, 2004

(51) Int. Cl.
*G06F 15/173* (2006.01)
*H04L 12/66* (2006.01)
*H04M 1/64* (2006.01)

(52) U.S. Cl. ...................... 709/224; 370/352; 379/88.17

(58) Field of Classification Search .................. 709/224, 709/231, 228
See application file for complete search history.

(56) References Cited

U.S. PATENT DOCUMENTS

| 2002/0051464 A1* | 5/2002 | Sin et al. ........................ 370/466 |
| 2002/0061762 A1* | 5/2002 | Maggenti et al. ............. 455/519 |
| 2002/0176404 A1* | 11/2002 | Girard ............................ 370/352 |
| 2003/0058839 A1* | 3/2003 | D'Souza ........................ 370/352 |
| 2003/0076815 A1* | 4/2003 | Miller et al. ................... 370/352 |
| 2003/0093563 A1* | 5/2003 | Young et al. ................... 709/245 |
| 2003/0235184 A1* | 12/2003 | Dorenbosch et al. ......... 370/352 |
| 2004/0066925 A1* | 4/2004 | Rosera et al. ............ 379/207.02 |

* cited by examiner

*Primary Examiner* — John Follansbee
*Assistant Examiner* — Alan S Chou
(74) *Attorney, Agent, or Firm* — Matthew A. Pequignot; Pequignot + Myers LLC

(57) ABSTRACT

The communication apparatus includes a VoIP phone, a VoIP gateway, a communication network, and a network analyzer. The VoIP phone is a transmitting/receiving device to transmit and receive a VoIP phone call. A plurality of VoIP phone calls are transmitted and received over the communication network via the VoIP gateway. The network analyzer analyzes and monitors the plurality of VoIP phone calls transmitted and received over the communication network. Accordingly, a respective VoIP phone call is identified from the plurality of phone calls and associated with a respective data stream to be monitored and analyzed by the network analyzer.

17 Claims, 3 Drawing Sheets

MONITORING AN RTP DATA STREAM BASED ON A PHONE CALL

BACKGROUND OF THE INVENTION

1. Field of the Invention

The present invention relates to linking a VoIP (Voice Over Internet Protocol) phone call with a data stream, and more particularly, to monitoring the data stream corresponding to the VoIP phone call.

2. Description of the Related Art

Many phone calls are being transmitted over communication networks via VoIP (Voice Over Internet Protocol). Typically, for example, an RTP (Real-time Transmission Protocol) may be used to send packets of data streams to carry voice for the phone calls, such that each call has a data stream associated therewith. Sometimes, it is necessary for a third party to monitor the phone call. However, the third party at an arbitrary point inside a communication network has a difficult time isolating the particular RTP data stream associated with a respective phone call.

SUMMARY OF THE INVENTION

Accordingly, the present invention associates a VoIP (Voice Over Internet Protocol) phone call with a data stream, and more particularly, monitors the data stream corresponding to the VoIP phone call.

Additional advantages of the invention will be set forth in part in the description which follows and, in part, will be obvious from the description, or may be learned by practice of the invention.

The present invention provides a method including monitoring a communication line through which VoIP (Voice Over Internet Protocol) data streams are transmitted to identify and monitor a respective data stream transmitted through the communication line and associated with a respective phone call.

The present invention provides an apparatus including a connecting device establishing a plurality of VoIP (Voice Over Internet Protocol) phone calls over a communication network. Each of the phone calls is established via protocol communications and has a corresponding data stream. The apparatus further includes a phone-call identifying device identifying a respective phone call of the plurality of phone calls by monitoring the protocol communications, a filtering device filtering the respective data stream corresponding to the identified VoIP phone call from the communication network, and a monitoring device monitoring the filtered data stream.

The present invention provides a method including establishing a plurality of VoIP (Voice Over Internet Protocol) phone calls over a communication network. Each of the phone calls is established via protocol communications and has a corresponding data stream. The method further includes identifying a respective phone call of the plurality of phone calls by monitoring the protocol communications, filtering the respective data stream corresponding to the identified VoIP phone call from the communication network, and monitoring the filtered data stream.

The present invention provides an apparatus including a connecting means for establishing a plurality of VoIP (Voice Over Internet Protocol) phone calls over a communication network. Each of the phone calls is established via protocol communications and has a corresponding data stream. The apparatus further includes a phone-call identifying means for identifying a respective phone call of the plurality of phone calls by monitoring the protocol communications, a filtering means for filtering the respective data stream corresponding to the identified VoIP phone call from the communication network, and a monitoring means for monitoring the filtered data stream.

The present invention provides an apparatus including a connecting unit to connect a communication line in which a plurality of VoIP (Voice Over Internet Protocol) data streams are transmitted. Each of the VoIP data streams is associated with a VoIP phone call. The apparatus further includes an isolating unit to isolate a respective VoIP data stream from the plurality of VoIP data streams to monitor the respective VoIP data stream.

BRIEF DESCRIPTION OF THE DRAWINGS

The above and other advantages of the invention will become apparent and more appreciated from the following description of the preferred embodiments, taken in conjunction with the accompanying drawings of which.

DETAILED DESCRIPTION OF THE PREFERRED EMBODIMENTS

Figure 1:
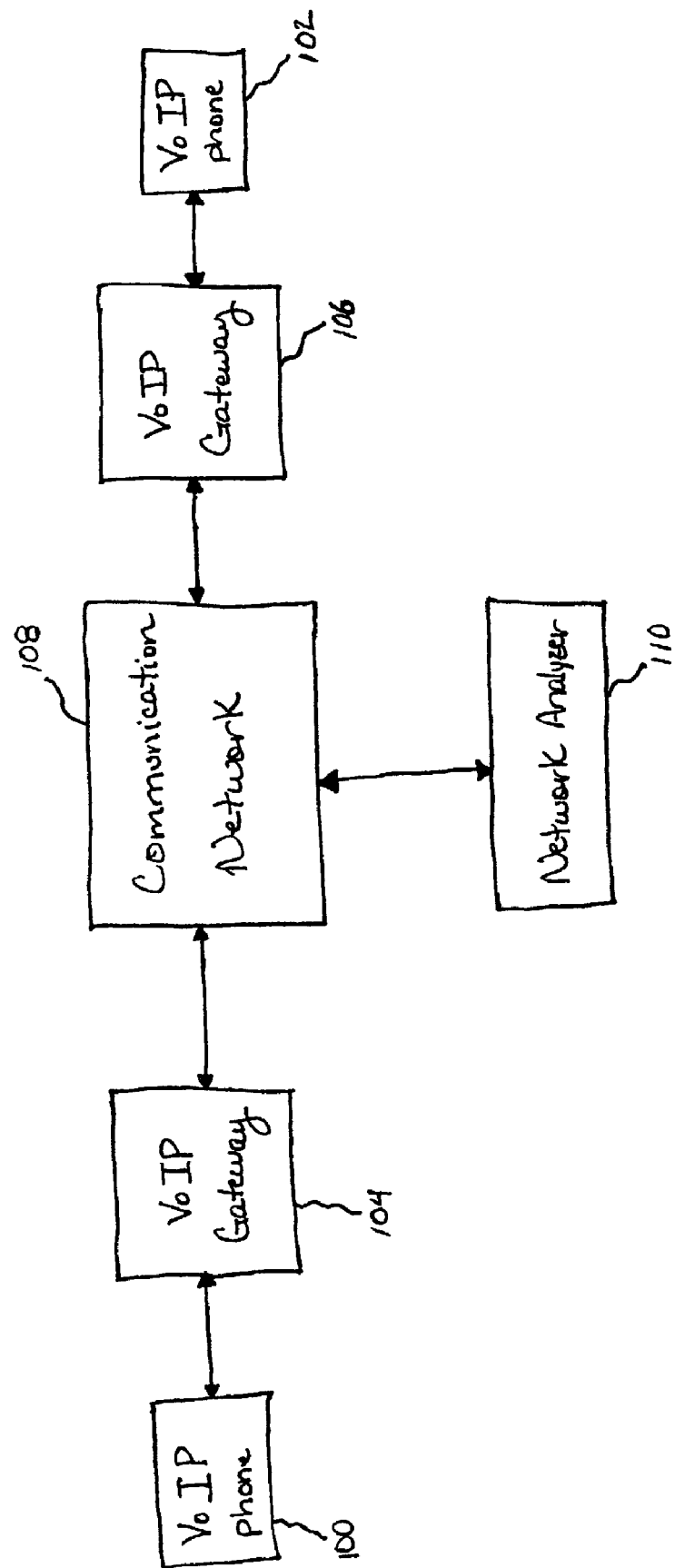
FIG. 1 is a diagram of a communication apparatus, according to an embodiment of the present invention.

Reference will now be made in detail to the present preferred embodiments of the present invention, examples of which are illustrated in the accompanying drawings, wherein like reference numerals refer to like elements throughout.

FIG. 1 is a diagram of a communication apparatus, according to an embodiment of the present invention. Referring now to FIG. 1, the communication apparatus includes VoIP phones 100 and 102, VoIP gateways 104 and 106, a communication network 108, and a network analyzer 110. The VoIP phones 100 and 102 are transmitting/receiving devices to transmit and receive a VoIP phone call. Typically, a plurality of VoIP phone calls are transmitted and received over the communication network 108 via the VoIP gateways 104 and 106. Each of the plurality of VoIP phone calls are established via protocol communications and have a respective data stream associated therewith. The VoIP phones 100 and 102 initiate, commence, and terminate communication, for example, via a Session Initialization Protocol (SIP). However, there are many different protocols for VoIP communications, and the present invention is not limited to any specific type of protocol to initiate, commence, and terminate communication via the communication network 108.

The network analyzer 110 analyzes and monitors the plurality of VoIP phone calls transmitted and received over the communication network 108. For example, network analyzer 110 might look for errors in a respective VoIP phone call, and/or monitor the phone call for other reasons. The monitoring may take place at an arbitrary point in a communication line of the communication network 108. Accordingly, for example, the network analyzer 110 monitors the communication line through which the plurality of VoIP phone calls are transmitted to identify and monitor a respective data stream transmitted through the communication line and associated with a respective VoIP phone call. If the SIP protocol is used for communication between the VoIP phones 100 and 102, the SIP protocol would typically include Session Description Protocol (SDP) information to identify and monitor data streams.

The network analyzer 110 may be, for example, an Agilent Network Analyzer with J6844A Telephony Network Analyzer addon to monitor Internet protocol traffic over a communication network. However, the present invention is not limited to any specific type, model or manufacturer of network analyzer.

The communication network 108 can be, for example, a LAN, WAN, wireless network, wired network, the Internet, etc., or any combination of these. Thus, the communication network 108 is not limited to any particular configuration. FIG. 1 also shows the use of gateways 104 and 106. However, the present invention is not limited to the use of such gateways. Instead, many other hardware/software configurations can be used for VoIP communications, according to embodiments of the present invention.

Figure 2:
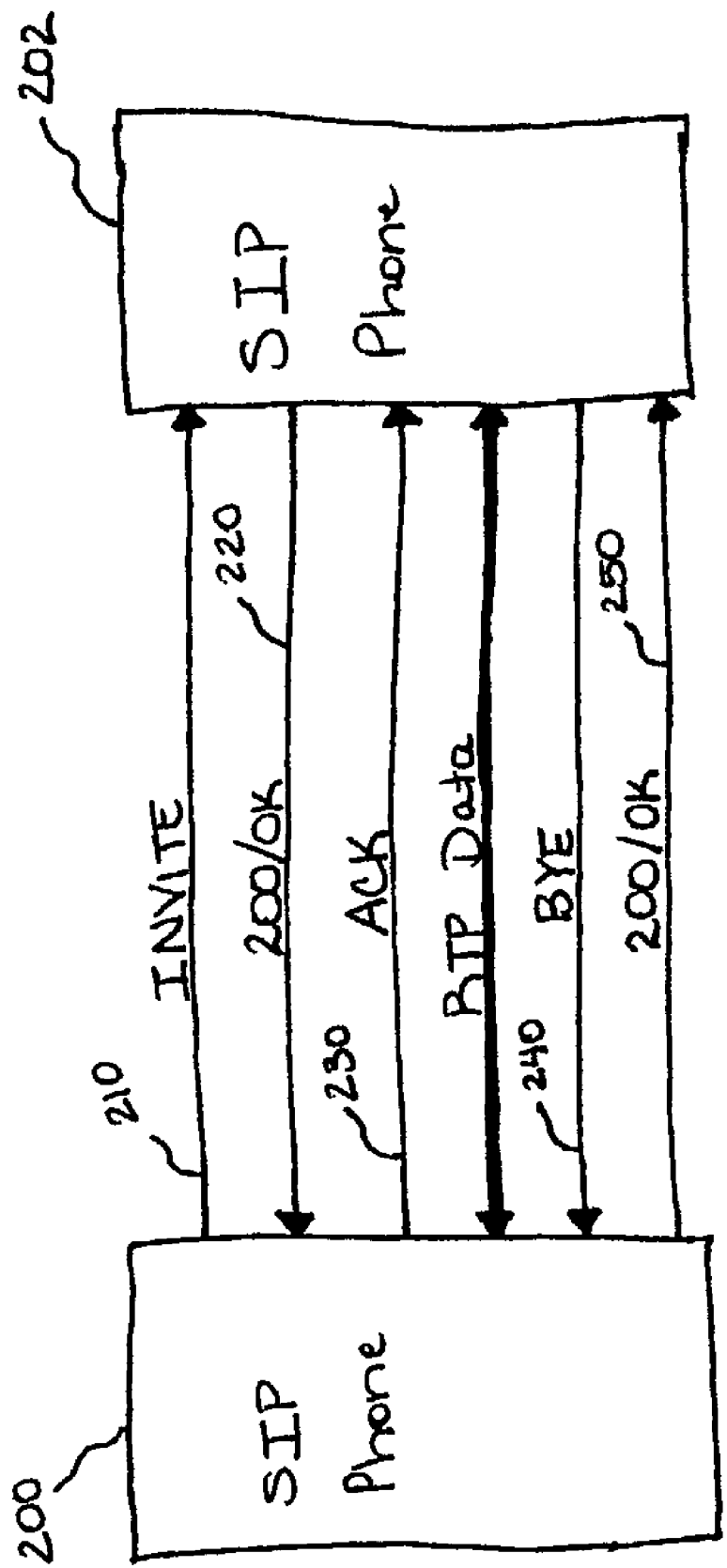
FIG. 2 is a diagram illustrating the basic flow of SIP signaling for a VoIP phone call, according to an embodiment of the present invention.

FIG. 2 is a diagram illustrating a basic flow of SIP signaling for a VoIP phone call, according to an embodiment of the present invention. Referring now to FIG. 2, the SIP is used to make a VoIP phone call. In operation 210, an SIP phone 200 sends an INVITE to an SIP phone 202 using the SIP protocol. The INVITE includes information that the SIP phone 202 will need to talk with the SIP phone 200, along with other data such as, for example, a phone number, time, date, etc. Also, attached to the INVITE is, for example, the SDP information describing CODEC, IP (Internet Protocol) address, and port to be used for a phone conversation with the SIP phone 200.

From operation 210, the process moves to operation 220, where if the SIP phone 202 desires to talk with the SIP phone 200, the SIP phone 202 will then send a 200/OK SIP message back to the SIP phone 200, thus providing the SIP phone 200 with the information needed to talk with the SIP phone 202. Here, for example, the information includes the phone number, time, date, etc. Also, attached to the 200/OK is, for example, SDP information describing CODEC, IP (Internet Protocol) address, and port to be used for the phone conversation with the SIP phone 202.

From operation 220, the process moves to operation 230, where upon receiving the 200/OK, the SIP phone 200 will send, for example, the SIP phone 202 an ACK signal indicating that the SIP phone 200 acknowledges the 200/OK and thus, wishes to begin the VoIP phone call. RTP (Real-time Transmission Protocol) is then used to send packets of data streams to carry voice to the SIP phone 200 and the SIP phone 202. The data streams are transmitted and received over the communication network 108.

From operation 230, the process moves to operation 240, where if the SIP phone 200 or the SIP phone 202 decides to end the VoIP phone call, the SIP phone 200 or the SIP phone 202 will send, for example, a BYE SIP message to the other. From operation 240, the process moves to operation 250, where, for example, upon receiving the BYE, a 200/OK is sent to formally end the VoIP phone call.

As described above, FIG. 2 shows the general concept of using SIP for VoIP communications. However, the present invention is not limited to the specific operations shown in FIG. 2, and many variations are possible.

Also, in accordance with the above, a user may instruct the network analyzer 110 to look for a particular phone number. The network analyzer 110 then, for example, begins monitoring traffic over a connection, and further traces and decodes all SIP signaling packets transmitted and received over the communication network 108. When the INVITE or 200/OK is transmitted over the communication network 108, the network analyzer 110 identifies the VoIP phone call associated with the INVITE or 200/OK, along with RTP connection information provided by the SDP. Thus, when the VoIP phone call is identified by the network analyzer 110, the RTP data stream associated with the VoIP phone call is monitored and analyzed by the network analyzer 110.

Gateways or other devices may or may not be used to implement the operations shown in FIG. 2. The present invention is not limited to any specific devices for implementing the operations.

Figure 3:
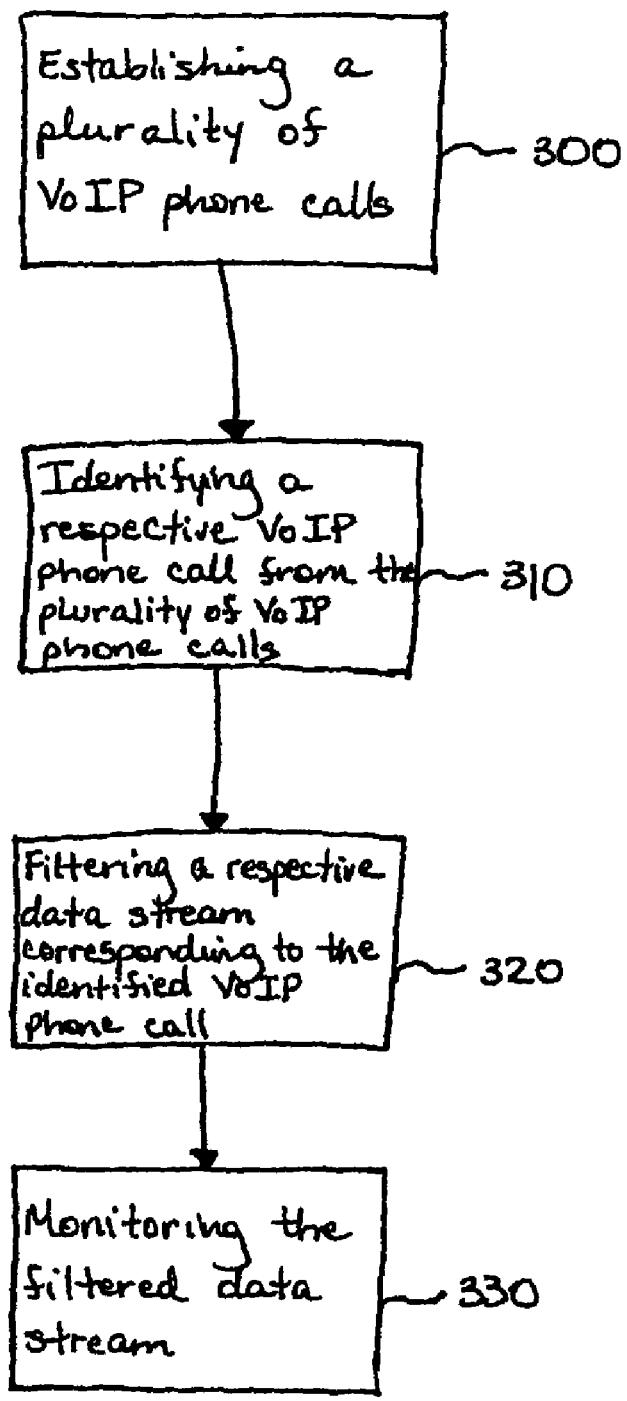
FIG. 3 is a block diagram illustrating a process of monitoring a data stream corresponding to a VoIP phone number, according to an embodiment of the present invention.

FIG. 3 is a block diagram illustrating a process of monitoring a data stream corresponding to a VoIP phone number, according to an embodiment of the present invention. Referring now to FIG. 3, a plurality of VoIP phone calls are established over the communication network 108 in operation 300. Each of the VoIP phone calls are established via protocol communications and have a corresponding data stream. From operation 300, the process moves to operation 310, in which a respective VoIP phone call is identified from the plurality of VoIP phone calls by monitoring the protocol communications. From operation 310, the process moves to operation 320, where a respective data stream corresponding to the identified VoIP phone call is filtered from the communication network 108. From operation 320, the process moves to operation 330, in which the respective data stream filtered from the communication network 108, is monitored by the network analyzer 110.

As described above, in the present invention, a plurality of VoIP phone calls are established over a communication network via protocol communications. From the plurality of VoIP phone calls, a user desires to identify a respective VoIP phone call associated with a corresponding data stream. The association is performed during a call setup initiated by a VoIP phone that desires to carry out a phone conversation over the communication network. Once the VoIP phone call is associated with the corresponding data stream, information associated with the corresponding data stream may be used to initiate a network analyzer to identify and monitor the phone conversation. When the VoIP phone call is identified, the corresponding data stream is filtered. Thus, by filtering the data stream, which corresponds to the VoIP phone call, the filtered data stream is monitored and analyzed.

Various examples described herein relate to the use of SIP, RTP, etc. However, the present invention is not limited to any particular protocol. Instead, there are many different protocols, which can be implemented to implement VoIP phone calls, according to the present invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method comprising:
   monitoring a communication line through which Voice Over Internet Protocol (VoIP) data streams are transmitted between a first VoIP gateway and a second VoIP gateway, the first and second VoIP gateways each providing a VoIP phone with access to the communication line, to identify and monitor a respective data stream that is transmitted through the communication line and which is associated with a respective phone call.

2. The method of claim 1, wherein the monitoring occurs at an arbitrary point in the communication line.

3. The method of claim 1, wherein the monitoring filters the respective data stream from a plurality of VoIP data streams being transmitted and received through the communication line.

4. The method of claim 2, wherein the transmitting phone and the receiving phone communicate via a Session Initialization Protocol (SIP).

5. The method of claim 2, wherein the transmitting phone and the receiving phone are VoIP phones.

6. The method of claim 4, wherein the SIP protocol used for communication between the transmitting phone and the receiving phone includes Session Description Protocol (SDP) information to identify and monitor the respective data stream.

7. An apparatus comprising:
- a connecting device establishing a plurality of Voice Over Internet Protocol (VoIP) phone calls over a communication network between a first VoIP gateway and a second VoIP gateway, the first and second VoIP gateways each providing a VoIP phone with access to the communication network, each of the phone calls being established via protocol communications and having a corresponding data stream;
- a phone call identifying device identifying a respective phone call of the plurality of phone calls by monitoring the protocol communications;
- a filtering device filtering the respective data stream corresponding to the identified VoIP phone call from the communication network; and
- a monitoring device monitoring the filtered data stream.

8. The apparatus according to claim 7, wherein the VoIP phone call over the communication network is connected between a first and second transmitting/receiving device.

9. The apparatus according to claim 8, wherein the data stream is transmitted by the first transmitting/receiving device, and received by the second transmitting/receiving device.

10. The apparatus according to claim 8, wherein the first and second transmitting/receiving device communicate via a Session Initialization Protocol (SIP).

11. The apparatus according to claim 10, wherein the SIP protocol used for communication between the first and second transmitting/receiving device includes Session Description Protocol (SDP) information to identify and monitor the data stream.

12. The apparatus according to claim 7, wherein the monitoring device is a data stream network analyzer.

13. The apparatus according to claim 7, wherein the monitoring device identifies and monitors the filtered data stream corresponding to the identified VoIP phone call at an arbitrary point in the communication network.

14. The apparatus according to claim 7, wherein the monitoring device monitors the filtered data stream to determine errors in the VoIP phone call.

15. A method comprising:
- establishing a plurality of Voice Over Internet Protocol (VoIP) phone calls over a communication network between a first VoIP gateway and a second VoIP gateway, the first and second VoIP gateways each providing a VoIP phone with access to the communication network, each of the phone calls being established via protocol communications and having a corresponding data stream;
- identifying a respective phone call of the plurality of phone calls by monitoring the protocol communications;
- filtering the respective data stream corresponding to the identified VoIP phone call from the communication network; and
- monitoring the filtered data stream.

16. An apparatus comprising:
- means for establishing a plurality of Voice Over Internet Protocol (VoIP) phone calls over a communication network between a first VoIP gateway and a second VoIP gateway, the first and second VoIP gateways each providing a VoIP phone with access to the communication network, each of the phone calls being established via protocol communications and having a corresponding data stream;
- means for identifying a respective phone call of the plurality of phone calls by monitoring the protocol communications;
- means for filtering the respective data stream corresponding to the identified VoIP phone call from the communication network; and
- means for monitoring the filtered data stream.

17. An apparatus comprising:
- a connecting unit to connect a communication line in which a plurality of Voice Over Internet Protocol (VoIP) data streams are transmitted between a first VoIP gateway and a second VoIP gateway, the first and second VoIP gateways each providing a VoIP phone with access to the communication line, each of the VoIP data streams being associated with a VoIP phone call; and
- an isolating unit to isolate a respective VoIP data stream from the plurality of VoIP data streams to monitor the respective VoIP data stream.

* * * * *